Sept. 12, 1933.                H. H. HENRY                1,926,771
                              STORAGE BATTERY
                           Filed March 13, 1931

INVENTOR
Harry H. Henry
BY Loyal J. Miller
ATTORNEY

Patented Sept. 12, 1933

1,926,771

UNITED STATES PATENT OFFICE 1,926,771

STORAGE BATTERY

Harry H. Henry, Oklahoma City, Okla., assignor to Monark Battery Company, Inc., Chicago, Ill., a corporation of Delaware Application March 13, 1931. Serial No. 522,358

1 Claim. (Cl. 136—147)

My invention relates to storage batteries, and more particularly to grid separators for use in storage batteries.

The objects of my invention are to provide a device of this class which is novel, practical and of utility; which will positively prevent an internal short circuit in a battery between the lower portions of the plates, usually caused by the accumulation in the bottom of the battery box of disintegrated particles loosened from the bodies of the plates; which may be used as an adjunct to other separators between the grids or plates of a battery; which will provide additional insulation between such grids; which will be slotted to permit a ready access of the liquid within the battery to the usual grids and to the porous separators; which will resist, to an unusual degree, injury due to the expansion of the usual grids and separators caused by overcharging the battery; which will cause only an inconsiderable amount of internal resistance in the battery; which will lessen the cost of the usual grid separators; which will be cheap in manufacture; which will lengthen the life of the battery; which will be durable; which will be easily applied; and which will be efficient in accomplishing all the purposes for which it is intended.

It is usual in the construction of storage batteries to provide between the metal plates or grids of same, separators of thin porous wood or the like. In order that a proper degree of separation may be had without thickening the separators to an extent which would prevent the ready passage of the electrolyte therethrough, these thin separators are provided with vertical ribs.

Batteries are frequently overcharged and when so overcharged they become overheated. The excessive heat expands the grids to an extent which sometimes causes them to so tightly squeeze the wooden separators that the latter are cut through, thus allowing the contact of a positive with a negative plate, and so shorting out that particular cell.

In an effort to prevent this contact, some manufacturers have had recourse to rubber separators placed between the usual porous separators, of wood or the like, and the battery plates. The rubber separators of several types function properly as a means of protecting the plates from contacting each other but so far as this applicant knows or has been able to ascertain from a considerable study of the art, no one has attempted to prevent an internal short circuit in a battery by protecting the lower ends of the plates from contact with conductive sediment which commonly accumulates in the bottom of a battery box, except by the provision of upstanding ribs or other supports in the bottoms of battery boxes to support the cells off the bottom of the box, for the purpose of preventing their contact with accumulated conductive sediment. When these supports are used it is necessary that the box be made somewhat deeper than the cells, which results in a considerable increase in the cost of manufacturing the box.

My device is designed to not only protect the plates from eventual contact with each other due to expansion, but also to protect them from contact with accumulated conductive sediment.

With these and other objects in view as will more fully appear, my invention consists in the construction, novel features, and combination of parts hereinafter more fully described, pointed out in the claim hereto appended, and illustrated in the accompanying one-sheet drawing, of which:

Like characters of reference designate like parts in all the figures.

Figure 1:
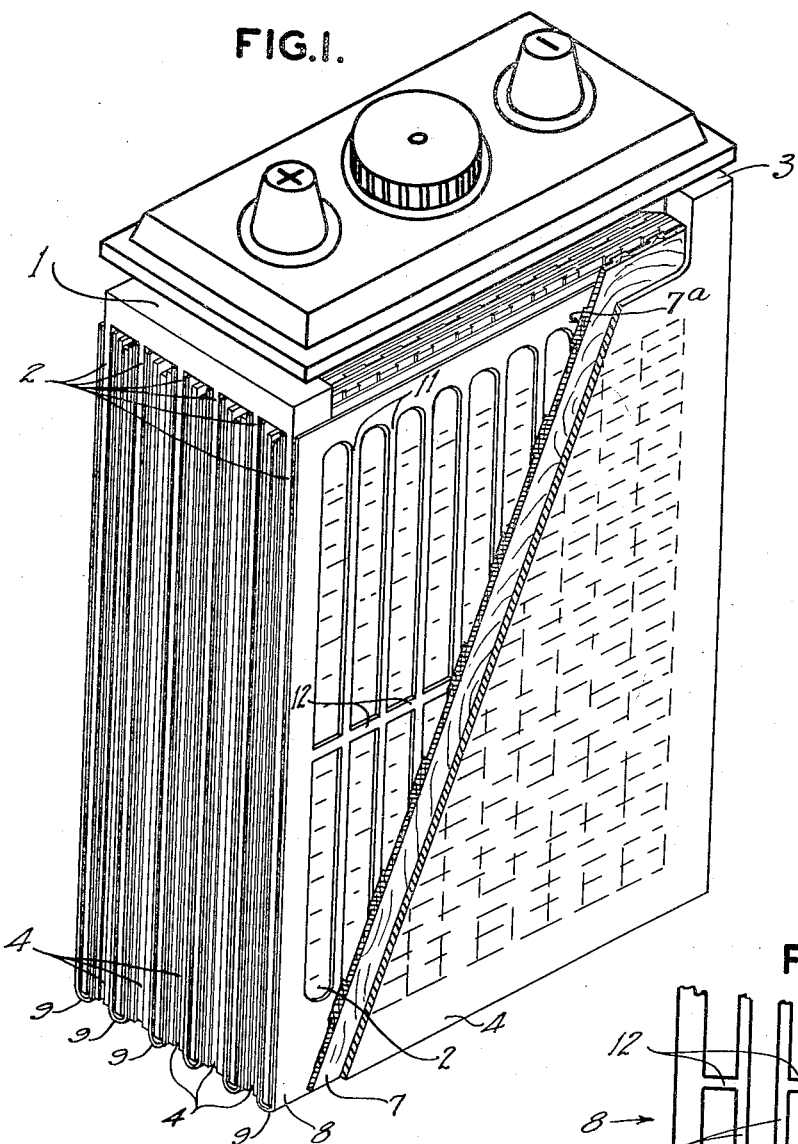
Figure 1 is a perspective view, partially in section, of one cell of a battery arranged in conformity with the invention.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

One practical embodiment of the invention as illustrated in the drawing follows:

The reference numeral 1 indicates a usual positive unit or electrode of a battery cell, and 2 indicates each of a plurality of usual depending parallel thin rectangular plates. The reference numeral 3 indicates a usual negative electrode or unit of the same cell having usual depending plates 4. Numeral 5 indicates the bottom of the battery box and 6 a vertical partition between the cells of the battery. Numeral 7 indicates the usual porous grid separators which are most often constructed of wood, and 8 my rubber separators in the disposition and configuration of which rests the invention.

The porous grid separators 7 are provided with integral ribs 7a which are preferably formed on one side of the separators 7 and preferably contact with the separators 8.

Figure 2:
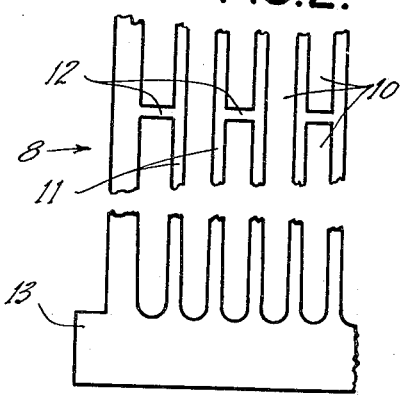
Fig. 2 is a fragmentary side elevational view of my separator.
Figure 3:
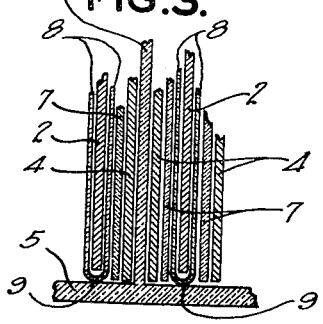
Fig. 3 is a fragmentary elevational sectional view of a battery box housing a cell equipped with the separator.

Said separators 8 are constructed preferably of a comparatively hard rubber inert composition of non-conductive nature, and in cross-section are substantially U-shaped. Each separator 8 is formed of a thin sheet of a size sufficient that when folded, as shown at 9, the separator will completely cover both sides and the lower edge of the plates 2 or 4. Each of said separators 8 is provided upon each of its sides with a plurality of vertical spaced slots 10, the vertical webs 11 therebetween being adapted to contact the vertical ribs of said plates 2 or 4. Said webs 11 are provided with connecting horizontal webs 12 to insure their proper spacing at all times. Said webs 12 may be placed between each adjacent pair of webs 11, as shown in Fig. 1 or may be placed between each alternating pair of said webs 11, as shown in Fig. 2. The ribs 7a on the separators 7 are alined with the vertical webs 11 of the separators 8. This construction, in which the webs 11, the ribs 7a and the vertical ribs of the plates 2 register with each other, insures that the webs 11 and the ribs 7a will affect the operation of the battery to the slightest possible extent. It will be noted that the thin web-like portions of the separators 7 register with the openings in the separators 8 and therefore are alined with the active portions of the plates 2. This construction has been found exceedingly advantageous in practice.

It may be noted from Fig. 1 of the drawing that said separators 8 extend somewhat above the upper edges of the plates 4, and that said slots 10 terminate at their upper ends slightly above the upper edges of the plates 4. This is done for the purpose of preventing the formation of gas pockets between the plates and the separators.

As a means for preventing contact of the lower edges of said plates 2 or 4 with any accumulation in the bottom of the battery box, said bent portion 9 of each of said separators is made solid. In other words said slots 10 terminate at their lower ends some little distance above the point at which separators 8 are bent back upon themselves. It may be seen that this arrangement effectually encloses the bottom edges of the plates, but it may also be seen that in order to completely protect the lower portions of the plates, some means must be provided for enclosing the lower portions of the side edges of the plates. This may be accomplished by the provision, at each edge of the lower portion of each of said separators 8, of an outstanding flap 13 which may be folded around the edge of the plate. It might also be accomplished by forming the box in such a size that its side walls would exactly fit the separators and firmly contact both side edges thereof. Another way in which the edges of the plates may be protected against contact with accumulated sediment is by forming the separators in a width slightly greater than the width of the plates, and then drawing the edge portions of the separators together and fusing them together around the edges of the plates.

Obviously, the invention is susceptible of embodiment in forms other than that which is illustrated in the accompanying drawing and described herein, and applicable for uses and purposes other than as detailed, and I therefore consider as my own all such modifications and adaptions and other uses of the form of the device herein described as fairly fall within the scope of my invention.

Having thus described my invention, what is claimed and desired to be secured by Letters Patents, is:

In a storage battery, in combination, an electrode having spaced vertically disposed reenforcing ribs, a separator formed of insulating material and comprising two integral slotted sheet-like portions joined to each other by an integral imperforate U-shaped portion in which the lower edge of the electrode is nested, the slotted sheet-like portions being substantially co-extensive with the electrode and said slots extending vertically in each of said sheet-like portions, the vertically extending portions of the separator between said slots registering with the vertically extending ribs in said electrode, and porous separators of wood disposed against the outer sides of said sheet-like portions and provided with ribs registering with the vertically extending portions between said slots of the first mentioned separator and also registering with the vertically extending ribs in said electrode.

HARRY H. HENRY.